(12) United States Patent
Hiramatsu et al.

(10) Patent No.: US 11,884,276 B2
(45) Date of Patent: Jan. 30, 2024

(54) TRAVEL ASSISTANCE METHOD AND TRAVEL ASSISTANCE DEVICE

(71) Applicants: Nissan Motor Co., Ltd., Yokohama (JP); Renault S.A.S., Boulogne-Billancourt (FR)

(72) Inventors: Machiko Hiramatsu, Kanagawa (JP); Yuji Takada, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/918,025

(22) PCT Filed: Apr. 15, 2020

(86) PCT No.: PCT/IB2020/000344
§ 371 (c)(1),
(2) Date: Oct. 10, 2022

(87) PCT Pub. No.: WO2021/209779
PCT Pub. Date: Oct. 21, 2021

(65) Prior Publication Data
US 2023/0150507 A1  May 18, 2023

(51) Int. Cl.
*B60W 30/095* (2012.01)
*B60W 30/18* (2012.01)
(Continued)

(52) U.S. Cl.
CPC .. *B60W 30/18163* (2013.01); *B60W 50/0097* (2013.01); *B60W 60/005* (2020.02);
(Continued)

(58) Field of Classification Search
CPC ....... B60W 30/18163; B60W 50/0097; B60W 2520/10; B60W 2552/00; B60W 2552/50;
(Continued)

(56) References Cited

U.S. PATENT DOCUMENTS

2016/0207534 A1  7/2016  Nishimura et al.
2016/0335892 A1*  11/2016  Okada ................... G08G 1/123
(Continued)

FOREIGN PATENT DOCUMENTS

DE  102017204572 A1 *  9/2018
DE  102018127077 A1 *  4/2020
(Continued)

*Primary Examiner* — Hunter B Lonsberry
*Assistant Examiner* — Daniel M. Robert

(57) ABSTRACT

A travel assistance method for performing a lane change of a host vehicle includes: detecting an oncoming vehicle traveling in an opposite lane from which the host vehicle travels when the host vehicle starts the lane change; determining a crossing point between a virtual advancing route and a linear advancing route in which the oncoming vehicle advances linearly, the virtual advancing route being a virtual extension of an advancing route of the host vehicle during a period from start to end of the lane change; executing a lane change using the route and the vehicle speed in a case where a time difference between a first predicted time and a second predicted time is outside a predetermined range; and when within the predetermined range, executing a lane change by changing at least one of the route and the vehicle speed such that the time difference is outside the predetermined range.

14 Claims, 12 Drawing Sheets

(51) Int. Cl.
*B60W 50/00* (2006.01)
*B60W 60/00* (2020.01)
*G05D 1/00* (2006.01)

(52) U.S. Cl.
CPC ....... *G05D 1/0061* (2013.01); *B60W 2520/10* (2013.01); *B60W 2552/00* (2020.02); *B60W 2552/50* (2020.02); *B60W 2554/4041* (2020.02); *B60W 2554/4042* (2020.02); *B60W 2554/4044* (2020.02); *B60W 2710/207* (2013.01); *B60W 2720/106* (2013.01)

(58) Field of Classification Search
CPC . B60W 2554/4041; B60W 2554/4042; B60W 2554/4044; B60W 2710/207; B60W 2720/106; B60W 30/09; B60W 30/095; B60W 2554/80; B60W 2554/804
See application file for complete search history.

(56) References Cited

U.S. PATENT DOCUMENTS

| | | | |
|---|---|---|---|
| 2017/0113665 A1* | 4/2017 | Mudalige | G08G 1/166 |
| 2017/0232964 A1 | 8/2017 | Moritani et al. | |
| 2018/0178841 A1* | 6/2018 | Ikedo | B62D 15/0295 |
| 2020/0198638 A1* | 6/2020 | Voelz | B60W 60/00276 |
| 2021/0114591 A1 | 4/2021 | Kamiya et al. | |
| 2022/0073090 A1* | 3/2022 | Kakeshita | B60W 50/14 |
| 2023/0150507 A1* | 5/2023 | Hiramatsu | B60W 50/0097 701/26 |

FOREIGN PATENT DOCUMENTS

| | | |
|---|---|---|
| JP | 2016-132374 A | 7/2016 |
| JP | 2017-140993 A | 8/2017 |
| JP | 2019-101854 A | 6/2019 |
| JP | 2020-006763 A | 1/2020 |
| WO | WO-2021075203 A1 * | 4/2021 |

* cited by examiner

TRAVEL ASSISTANCE METHOD AND TRAVEL ASSISTANCE DEVICE

TECHNICAL FIELD

The present invention relates to a travel assistance method and a travel assistance device.

BACKGROUND ART

In recent years, a system that detects a state of an obstacle that may be present on a travel route of a host vehicle and assists traveling of the host vehicle according to the state of the obstacle has been studied. JP 2017-140993 A discloses a method for controlling a host vehicle when a crosswalk crossing a travel route is present at a turning destination in a case where the host vehicle turns across an opposite lane at an intersection.

According to a technique disclosed in JP 2017-140993 A, when a pedestrian walking on the crosswalk is detected, a stop position of the host vehicle is controlled according to a distance from the intersection to the crosswalk. Specifically, when the distance from the intersection to the crosswalk is shorter than an entire length of the host vehicle, the host vehicle is stopped without turning. On the other hand, when the distance from the intersection to the crosswalk is longer than the entire length of the host vehicle, the host vehicle is stopped before the crosswalk after turning. By such control, it is possible to avoid approaching a pedestrian or an oncoming vehicle that may be present on the travel route of the host vehicle.

SUMMARY OF INVENTION

According to the technique disclosed in JP 2017-140993 A, it is possible to prevent the host vehicle from approaching an obstacle such as a pedestrian or an oncoming vehicle that may exist on the travel route of the host vehicle. However, in a case where the host vehicle performs a lane change or the like, even another vehicle (for example, an oncoming vehicle) traveling outside the travel route of the host vehicle may face and approach the host vehicle in front of the host vehicle.

An object of the present invention is to provide a lane change assistance method and a lane change assistance device capable of suppressing another vehicle traveling outside a travel route of a host vehicle from approaching the host vehicle in a state of facing the host vehicle in front of the host vehicle.

According to an aspect of the invention, a travel assistance method for performing a lane change of a host vehicle using a determined route and vehicle speed is provided. The travel assistance method includes: detecting an oncoming vehicle traveling in an opposite lane opposite to a lane in which the host vehicle travels when the host vehicle starts the lane change; determining a crossing point between a virtual advancing route and a linear advancing route in which the oncoming vehicle advances linearly, the virtual advancing route differing from the route and being a virtual extension of an advancing route of the host vehicle in an advancing direction during a period from start to end of the lane change; executing a lane change using the route and the vehicle speed in a case where a time difference between a first predicted time when it is assumed that the host vehicle reaches the crossing point and a second predicted time until the oncoming vehicle reaches the crossing point is outside a predetermined range; and when the time difference is within the predetermined range, executing a lane change by changing at least one of the route and the vehicle speed such that the time difference is outside the predetermined range.

DESCRIPTION OF EMBODIMENTS

Hereinafter, embodiments of the present invention will be described with reference to the drawings and the like.

First Embodiment

Figure 1:
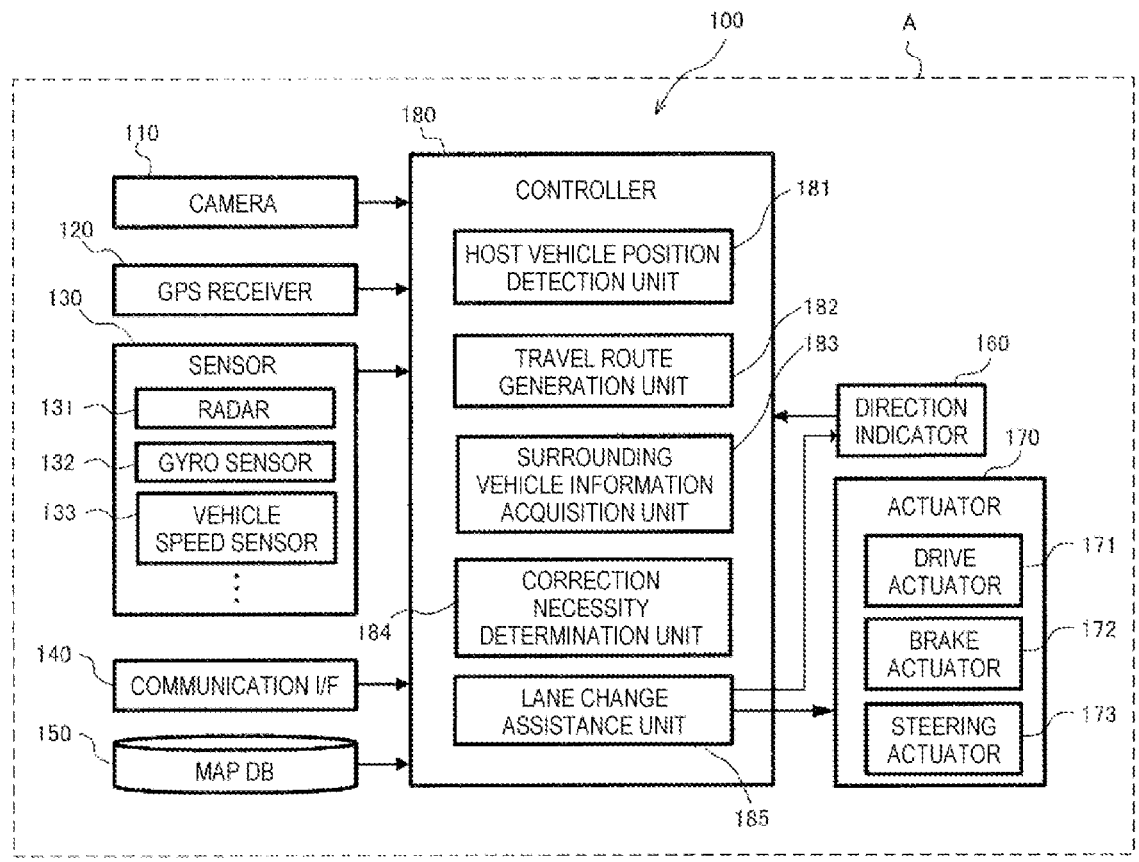
FIG. 1 is a schematic configuration diagram of a travel assistance device common to embodiments.

FIG. 1 is a schematic configuration diagram of a driving assistance device 100 common to the embodiments of the present invention.

As shown in FIG. 1, the driving assistance device 100 includes a camera 110, a GPS receiver 120, a sensor 130, a communication interface 140, a map database 150, a direction indicator 160, an actuator 170, and a controller 180. The driving assistance device 100 is mounted on, for example, a vehicle (a host vehicle A) having an autonomous driving function or a driving assistance function.

The camera 110 is an imaging device that images an external situation of the host vehicle A, and acquires imaging information on the external situation of the host vehicle A. The camera 110 is, for example, around view monitor cameras provided on vehicle exterior sides of front, rear, and left and right doors of the host vehicle A, a front camera provided on a vehicle exterior or interior side of a windshield, and a rear camera provided on a rear of the host vehicle A. The camera 110 outputs the imaging information on the external situation to a controller 180.

The GPS receiver 120 periodically receives a signal (GPS data) transmitted from a GPS satellite. The GPS receiver 120 outputs the received GPS data to the controller 180.

The sensor 130 includes a radar 131, a gyro sensor 132, a vehicle speed sensor 133, and the like, and detects a traveling state of the host vehicle A. The radar 131 detects an object outside the host vehicle A using radio waves. The radio waves are, for example, millimeter waves, and the radar 131 transmits the radio waves to surroundings of the host vehicle A and receives radio waves reflected by an object to detect the object. The radar 131 can acquire, for example, a distance or a direction to a surrounding object as object information. The gyro sensor 132 detects a direction of the host vehicle A. The vehicle speed sensor 133 detects a vehicle speed of the host vehicle A. The sensor 130 outputs the acquired object information and the detected direction and vehicle speed of the host vehicle A to the controller 180.

The communication interface 140 acquires a surrounding situation of the host vehicle A from an outside by wireless communication. The communication interface 140 receives various types of information from an intelligent transportation system (ITS) that transmits, for example, traffic information such as traffic jam information and traffic regulation information, wear information, and the like in real time. The ITS includes vehicle-to-vehicle communication with another vehicle, road-to-vehicle communication with a roadside device, and the like. The communication interface 140 acquires acceleration and deceleration of another vehicle around the host vehicle A, a relative position with respect to the host vehicle A, and the like, for example, by the vehicle-to-vehicle communication.

The map database 150 stores map information. The map information includes information on a shape, a gradient, a width, a speed limit, an intersection, a traffic light, the number of lanes, and the like of a road including a curvature of a curve and the like. The map information stored in the map database 150 can be referred to at any time by the controller 180 to be described later.

The direction indicator 160 is operated and stopped by an operation of a driver or a command from the controller 180. Operation and stop information of the direction indicator 160 is output to the controller 180.

The actuator 170 is a device that executes traveling control of the host vehicle A based on a command from the controller 180. The actuator 170 includes a drive actuator 171, a brake actuator 172, a steering actuator 173, and the like.

The drive actuator 171 is a device for adjusting a drive force of the host vehicle A.

When the host vehicle A is an internal combustion engine vehicle equipped with an engine as a traveling drive source, the drive actuator 171 includes a throttle actuator that adjusts an amount of air supplied to the engine (a throttle opening) and a fuel injection valve that adjusts an amount of fuel supplied to the engine (a fuel injection amount).

When the host vehicle A is a hybrid vehicle or an electric vehicle equipped with a motor as a traveling drive source, the drive actuator 171 includes a circuit (an inverter, a converter, and the like) capable of adjusting electric power supplied to the motor.

The brake actuator 172 is a device that operates a brake system in response to a command from the controller 180 and adjusts a braking force applied to wheels of the host vehicle A. The brake actuator 172 includes a hydraulic brake or a regenerative brake.

The steering actuator 173 includes an assistance motor that controls a steering torque in an electric power steering system, or the like. The controller 180 controls an operation of the steering actuator 173 to control an operation of the wheels, thereby assisting a lane change of the host vehicle A.

The controller 180 is constituted with a computer including a central processing unit (CPU), a read-only memory (ROM), a random access memory (RAM), and an input/output interface (an I/O interface). The controller 180 executes processing for implementing specific control by executing a specific program. The controller 180 may include one computer or a plurality of computers.

The controller 180 generates driving control information indicating a travel route (including a steering timing), a traveling vehicle speed (including acceleration and deceleration), and the like, and assists traveling of the host vehicle A according to the route and the vehicle speed indicated by the generated driving control information. When a lane change is included in the travel route, the controller 180 changes the route and the vehicle speed in the driving control information according to a situation around the host vehicle A, and assists the traveling of the host vehicle A according to the changed driving control information.

Figure 2:
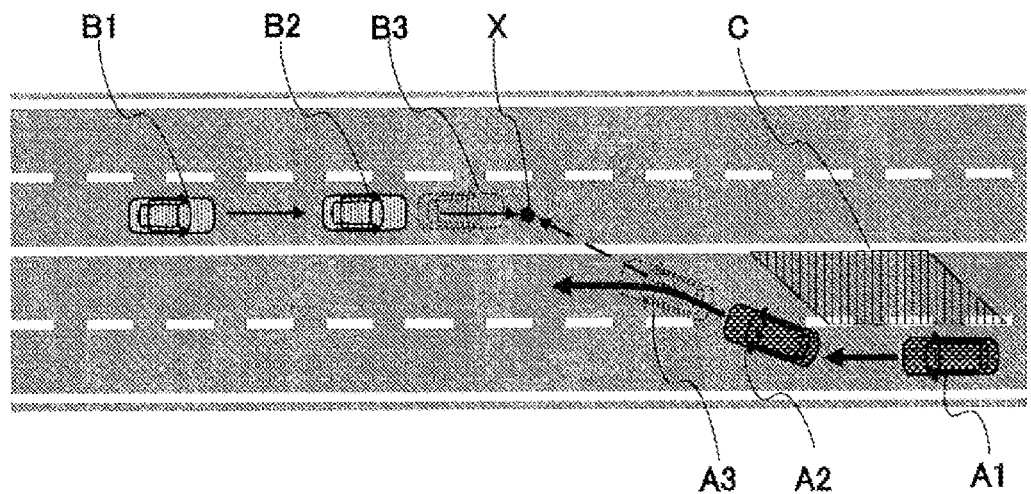
FIG. 2 is a diagram showing a situation around a host vehicle in a case where a determined route and vehicle speed (driving control information) is changed in travel assistance control according to a first embodiment.

FIG. 2 is a diagram showing an example in which the route and the vehicle speed indicated by the driving control information are changed when the lane change is performed in a state where the travel assistance control is performed. In the figure, a four-lane road with two lanes on each side is shown, and it is assumed that traveling on a left side is prescribed by law.

In two lanes on a lower side of the figure, the host vehicle A travels from a right side to a left side of the figure. Two lanes on an upper side of the figure are opposite lanes opposite to a travel lane of the host vehicle A, and an oncoming vehicle B travels from the left side to the right side of the figure in the opposite lanes. In the figure, a position of the host vehicle A at each of three times t1 to t3 is indicated by A1 to A3, and a position of the oncoming vehicle B at each of the three times t1 to t3 is indicated by B1 to B3.

Before the time t1, the host vehicle A is traveling in an outer lane that is not in contact with the opposite lane among the travel lanes of two lanes. It is assumed that an obstacle C is present in an inner lane in contact with the opposite lane. The obstacle C is, for example, a construction site or a stopping vehicle due to a breakdown.

At the time t1, the host vehicle A reaches the side of the obstacle C, and at the time t2, the host vehicle A passes the side of the obstacle C and starts a lane change to the inner lane. Then, at the time t3, the host vehicle A starts traveling in the inner lane and completes the lane change, and after the time t3, the host vehicle A travels in the inner lane.

It is assumed that the oncoming vehicle B is traveling in an opposite inner lane that is in contact with the travel lane of the host vehicle A, and the oncoming vehicle B does not perform a lane change. In the figure, oncoming vehicles B1 to B3 at the times t1 to t3 are shown.

In the figure, the travel route of the host vehicle A is indicated by a thick solid line, and the travel route includes a traveling track during the lane change (time t2 to time t3). The travel route predicted for the oncoming vehicle B is indicated by a thin solid line.

A virtual advancing route intersects with the predicted travel route of the oncoming vehicle B at a crossing point X, the virtual advancing route differing from the route and being a virtual extension of the advancing route of the host vehicle in an advancing direction during the lane change (any time from the time t2 when the lane change starts to the time t3 when the lane change ends) of the host vehicle A indicated by a broken line. This means that the host vehicle A and the oncoming vehicle B advance toward the crossing point X while facing each other, and approach each other. That is, since the host vehicle A and the oncoming vehicle B travel toward the crossing point X although the travel routes do not cross each other, both vehicles approach each other from the front. In such a situation, the driver of the host vehicle A performs a steering wheel operation in order to avoid the approach of the oncoming vehicle B from the front, and as a result, the driving assistance control may be interrupted.

Therefore, when both the host vehicle A and the oncoming vehicle B travel toward the crossing point X, the controller 180 changes the driving control information of the host vehicle A, and performs the travel assistance of the host vehicle A according to the changed driving control information. Accordingly, the host vehicle A and the oncoming vehicle B do not travel toward the crossing point X while facing each other during the lane change, and it is possible to suppress both vehicles from approaching from the front.

Referring again to FIG. 1, the controller 180 that performs such control includes a host vehicle position detection unit 181, a travel route generation unit 182, a surrounding vehicle information acquisition unit 183, a change necessity determination unit 184, and a lane change assistance unit 185. Hereinafter, these configurations will be described in detail.

The host vehicle position detection unit 181 constantly detects a current position, vehicle speed, and traveling direction of the host vehicle A based on the GPS data from the GPS receiver 120 and the direction and vehicle speed of the host vehicle A detected by the sensor 130. The host vehicle position detection unit 181 detects a position of the host vehicle A on a map with reference to the map database 150.

The host vehicle position detection unit 181 acquires road information on a road around the host vehicle A based on the detected current position, vehicle speed, traveling direction, and position on the map of the host vehicle A, the imaging information on the external situation acquired by the camera 110, and the object information acquired by the sensor 130. The road information includes information on a shape, a gradient, a width, a speed limit, an intersection, a traffic light, a type of lane, the number of lanes, and the like of the road around the host vehicle A.

The travel route generation unit 182 generates a travel route of the host vehicle A based on information such as the position or surrounding road condition of the host vehicle A detected by the host vehicle position detection unit 181 and a set destination. In the travel route, a travel position in a vehicle width direction on the road is shown. Further, the travel route generation unit 182 generates speed information (including acceleration and deceleration, the steering timing, and the like) in a case where the host vehicle A travels along the travel route.

In this way, the travel route generation unit 182 generates driving control information including the travel route and the speed information. In the example shown in FIG. 2, the driving control information indicating the travel route (including the steering timing) and the travel speed (including acceleration and deceleration) is generated so as to avoid the obstacle C on the side of the road and change the lane to the inner lane after passing the side of the obstacle C.

The surrounding vehicle information acquisition unit 183 acquires surrounding vehicle information based on the imaging information on the external situation acquired by the camera 110, the object information acquired by the sensor 130, and the surrounding situation of the host vehicle A acquired by the communication interface 140. The surrounding vehicle information includes a travel situation of another vehicle including the oncoming vehicle traveling in the opposite lane of the host vehicle A.

The change necessity determination unit 184 determines whether it is necessary to change the driving control information according to the situation around the host vehicle A. Specifically, as shown in FIG. 2, the change necessity determination unit 184 obtains the crossing point X between the virtual advancing route of the host vehicle A and a predicted linear advancing route of the oncoming vehicle B at the time t2 when the host vehicle A starts the lane change. Further, a virtual arrival time to predicted to be required for the host vehicle A to virtually reach the crossing point X and a predicted arrival time tb until the oncoming vehicle B reaches the crossing point X are obtained, and it is determined whether it is necessary to change the driving control information according to whether a time difference td between the two vehicles is within a predetermined range. Details of determination processing performed by the change necessity determination unit 184 will be described later with reference to FIG. 4.

The lane change assistance unit 185 performs the travel assistance involving the lane change of the host vehicle A. When the change necessity determination unit 184 determines that a change of the driving control information is necessary, the lane change assistance unit 185 changes the driving control information and performs the travel assistance of the host vehicle A based on a route and a vehicle speed indicated by the changed driving control information.

Figure 3:
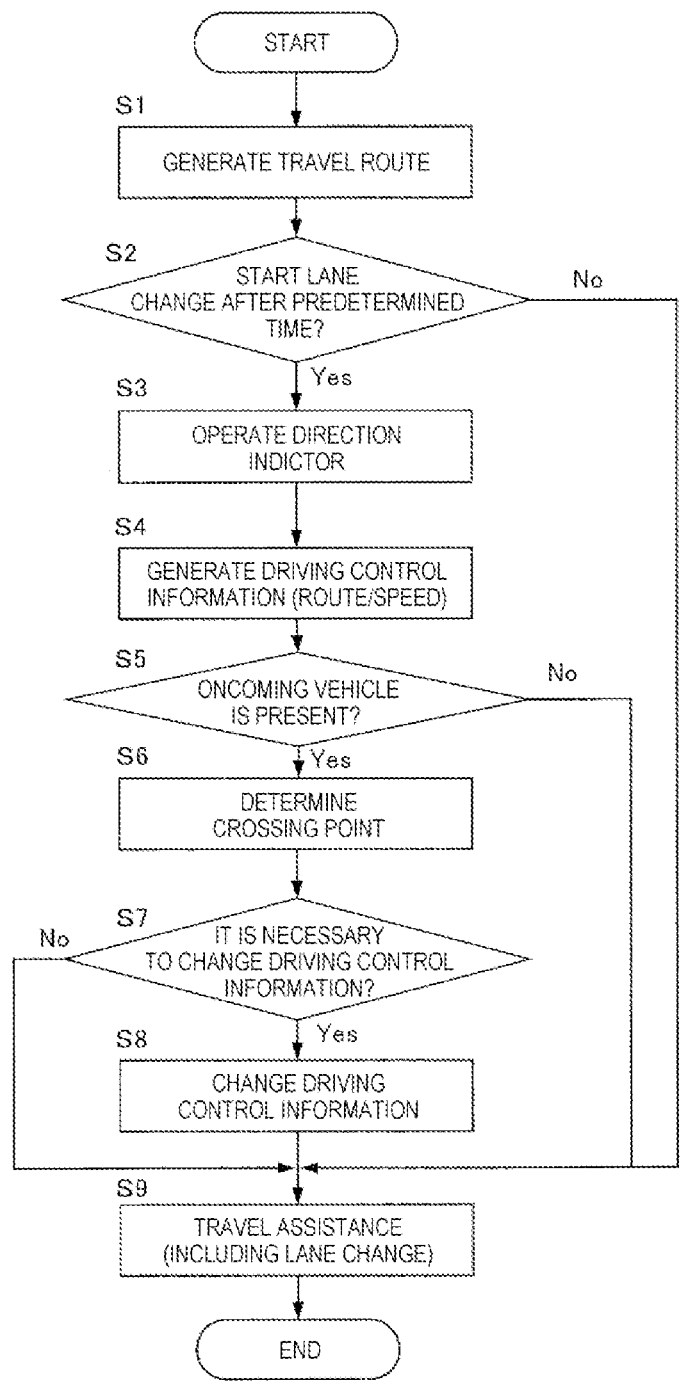
FIG. 3 is a flowchart showing the travel assistance control.

FIG. 3 is a flowchart of the travel assistance control executed by the controller 180. The travel assistance control is repeatedly executed at a predetermined cycle. The travel assistance control may be performed by executing a program stored in the controller 180.

In step S1, the controller 180 (the travel route generation unit 182) generates an approximate travel route and speed information of the host vehicle A based on the information such as the position of the host vehicle A detected by the host vehicle position detection unit 181, the set destination, and the like.

In step S2, the controller 180 (the travel route generation unit 182) determines whether to start a lane change after a predetermined time (for example, after 3 seconds) using the travel route calculated in step S1. In the example of FIG. 2, it is determined at the time t1 that the lane change is performed after the predetermined time, and the lane change is started at the time t2.

When it is determined that the lane change is started after the predetermined time (S2: Yes), processing of step S3 is performed next. When it is not determined that the lane change is performed after the predetermined time (S2: No), next, in processing of step S9, the travel assistance control is performed such that the vehicle travels on a determined travel route at a determined speed or acceleration.

In step S3, the controller 180 (the travel route generation unit 182) operates the direction indicator 160 to notify surrounding vehicles that the lane change is to be performed.

In step S4, the controller 180 (the travel route generation unit 182) creates driving control information indicating a traveling track, speed information, and the like when the lane change is performed. In the example of FIG. 2, a travel route along which the vehicle travels in the outer lane in front of the obstacle C and changes lanes to the inner lane after passing the side of the obstacle C, and speed information that the vehicle accelerates and decelerates without largely shaking in the travel route are generated.

In step S5, the controller 180 (the surrounding vehicle information acquisition unit 183) acquires a state of the surroundings of the host vehicle A, and detects presence or absence of the oncoming vehicle B facing the travel route of the host vehicle A after the lane change. When the oncoming vehicle B is present, the controller 180 further predicts a travel route of the oncoming vehicle B.

When the oncoming vehicle B is present (S5: Yes), processing of step S6 is performed next, and the crossing point X used for determining whether it is necessary to change the driving control information is calculated. When the oncoming vehicle B is not present (S5: No), the processing of step S9 is performed next, and the travel assistance is performed such that the lane change is performed according to the route and the speed indicated by the driving control information generated in step S4.

In step S6, the controller 180 (the change necessity determination unit 184) obtains the crossing point X used for determining whether it is necessary to change the driving control information in a subsequent step S7. Specifically, the controller 180 obtains the virtual advancing route, which is the virtual extension of the advancing route of the host vehicle forward in the advancing direction during the lane change, and obtains the crossing point X between the virtual advancing route and the predicted travel route of the oncoming vehicle B obtained in step S5.

In step S7, the controller 180 (the change necessity determination unit 184) obtains the virtual arrival time ta (a first predicted time) until the host vehicle A virtually reaches the crossing point X and the predicted arrival time tb (a second predicted time) until the oncoming vehicle B reaches the crossing point X, and determines whether it is necessary to change driving assistance information according to whether the time difference td between the virtual arrival time ta and the predicted arrival time tb is within the predetermined range.

Specifically, as shown in FIG. 2, the controller 180 obtains the virtual arrival time ta until the host vehicle A reaches the crossing point X in a case where it is assumed that the host vehicle A advances linearly on the virtual advancing route without completing the lane change. At the same time, the controller 180 predicts the predicted arrival time tb until the oncoming vehicle B reaches the crossing point X.

Further, the controller 180 obtains the time difference td between the virtual arrival time ta and the predicted arrival time tb, and determines whether correction is necessary according to whether the time difference td is within the predetermined range (for example, 1 second). When the time difference td is within the predetermined range, the controller 180 determines that the host vehicle A and the oncoming vehicle B may advance toward the crossing point X while facing each other at the same timing. In such a case, since the driver of the host vehicle A manually controls the vehicle in order to avoid traveling from the front of the oncoming vehicle B and driving control processing is likely to be interrupted, it is determined that correction of the driving control information is necessary.

In this way, when the time difference td is within the predetermined range, it is determined that the correction of the driving control information is necessary (S7: Yes), and then processing of step S8 is performed. When the time difference td is outside the predetermined range, it is determined that the correction of the driving control information is unnecessary (S7: No), and then the processing of step S9 is performed.

In step S8, the controller 180 (the lane change assistance unit 185) changes the route and the speed indicated by the driving control information of the host vehicle A. Due to the change of the driving control information, at least one of the crossing point X, the virtual arrival time ta, and the predicted arrival time tb is changed, and the time difference td is outside the predetermined range. As a result, since the host vehicle A and the oncoming vehicle B are suppressed from advancing to the crossing point X while facing each other at the same timing, it is possible to reduce a possibility that the driver of the host vehicle A manually performs control and the driving control processing is interrupted. A specific modification example of the driving control information will be described later with reference to FIGS. 4A to 4C, 5A, and 5B.

In step S9, the controller 180 (the lane change assistance unit 185) assists the lane change of the host vehicle A according to the driving control information. When the driving control information is changed in step S8, the travel assistance is performed based on the changed driving control information. Accordingly, the time difference td is outside the predetermined range, and it is possible to suppress that the driving control processing is interrupted due to the operation of the driver of the host vehicle A and a behavior of the host vehicle A is unstable.

Figure 4A:
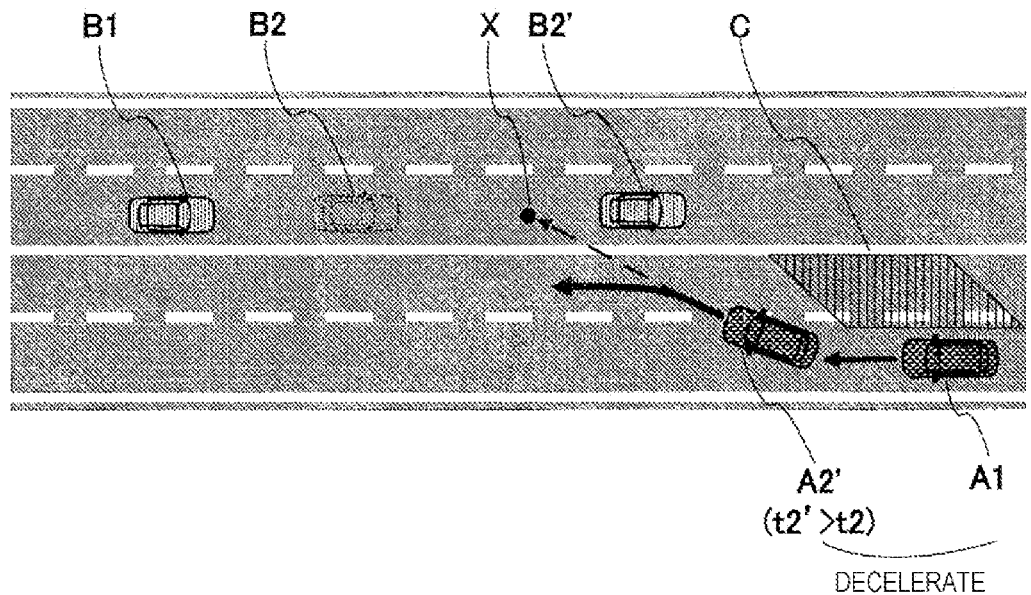
FIG. 4A is an explanatory diagram of an example of changing a vehicle speed.
Figure 4B:
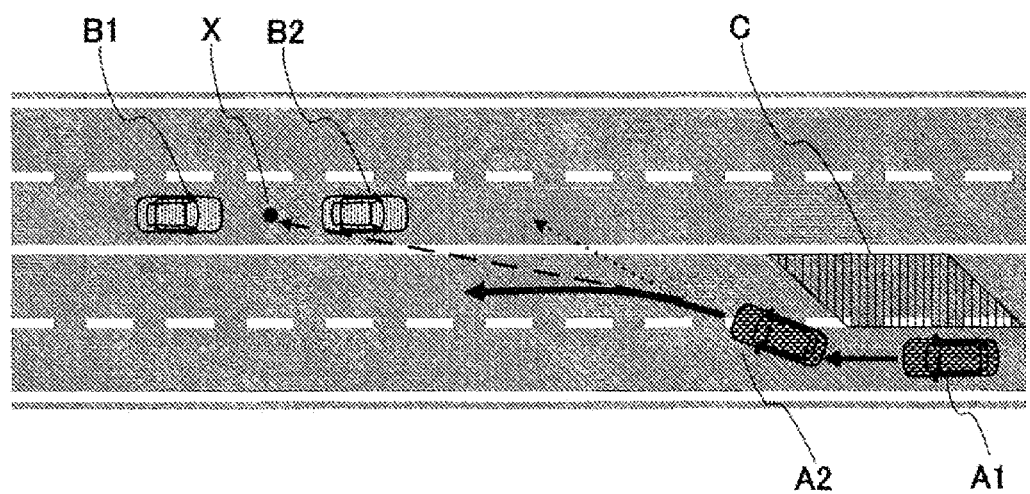
FIG. 4B is an explanatory diagram of an example of changing a route.
Figure 4C:
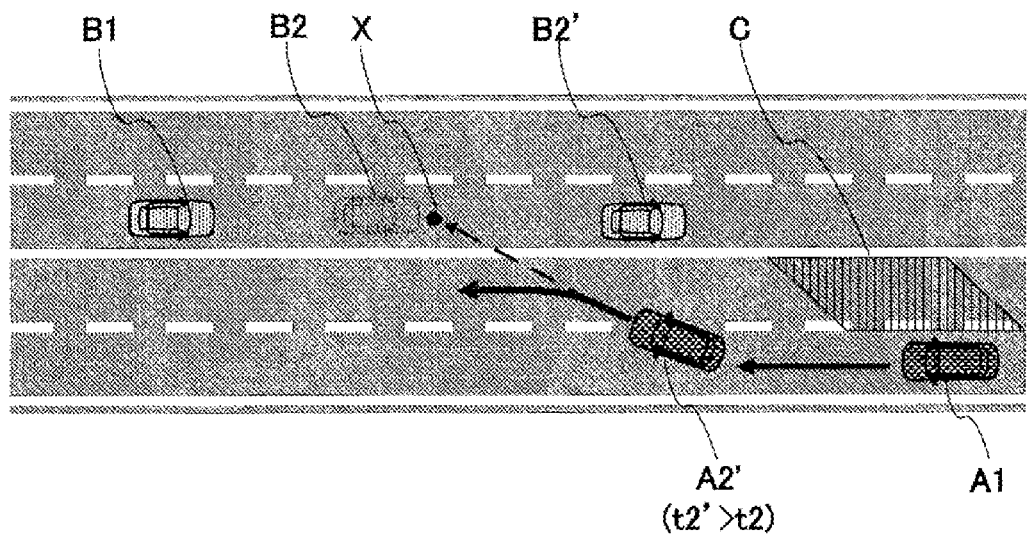
FIG. 4C is an explanatory diagram of an example of changing a route.
Figure 5A:
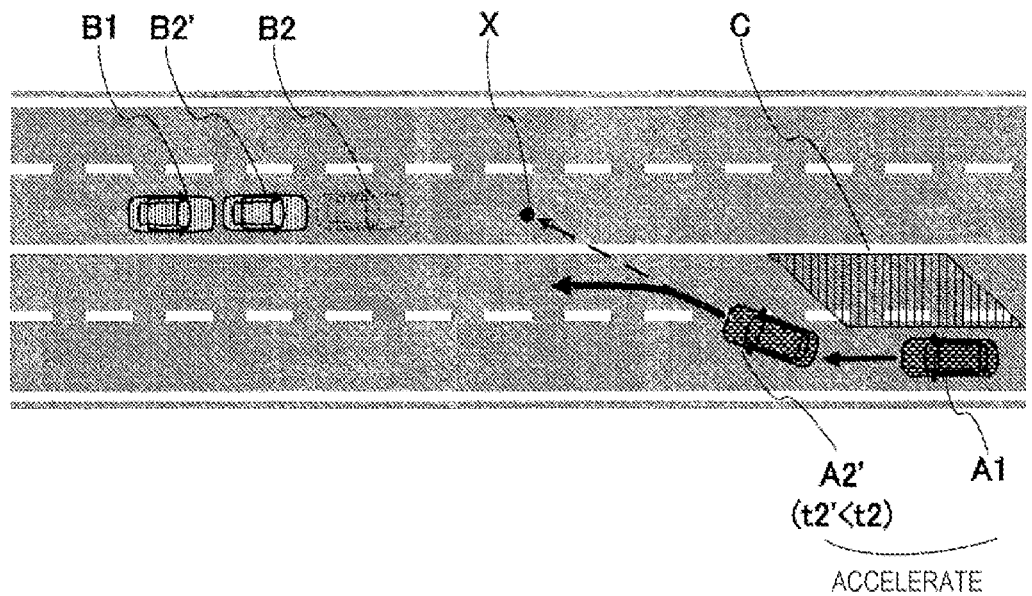
FIG. 5A is an explanatory diagram of an example of changing a vehicle speed.
Figure 5B:
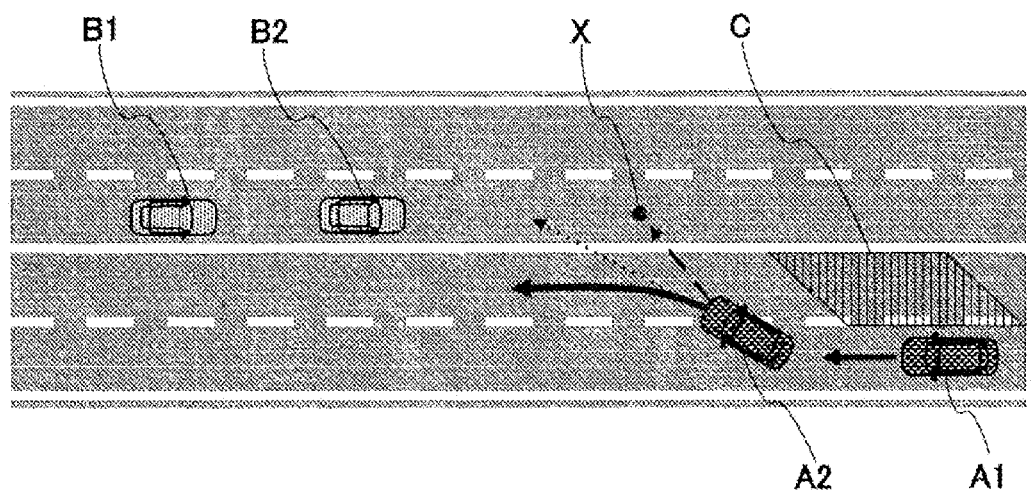
FIG. 5B is an explanatory diagram of an example of changing a route.

Examples of a case where the driving control information is changed in step S8 are shown in FIGS. 4A to 4C and FIGS. 5A and 5B. FIGS. 4A to 4C show examples in which the driving control information is changed when the time difference td is within the predetermined range and the change is determined to be necessary (S7: Yes) and when the virtual arrival time ta of the host vehicle A is longer (later) than the predicted arrival time tb of the oncoming vehicle B. FIGS. 5A and 5B show examples in which the driving control information is changed when the time difference td is within the predetermined range and the correction is determined to be necessary (S7: Yes) and when the virtual arrival time ta is shorter (earlier) than the predicted arrival time tb.

In an example of FIG. 4A, the controller 180 (the lane change assistance unit 185) changes the speed information (the driving control information) such that a speed of the host vehicle A is slower than a speed that has already been set before the start of the lane change without changing the travel route. Due to the change, a time t2' when the lane change is started according to the driving control information after the change is later than the time t2 when the lane change is started according to the driving control information before the correction. In the figure, positions of the host vehicle A and the oncoming vehicle B corresponding to times t1, t2, and t2' are shown. A position A2 of the host vehicle A at the time t2 before the correction is omitted for readability.

Since the start time t2' of the lane change is delayed by decelerating the host vehicle A before the start of the lane change, the virtual arrival time ta until the host vehicle A virtually reaches the crossing point X becomes longer. The virtual arrival time ta longer than the predicted arrival time tb becomes even longer, and thus the time difference td is outside the predetermined range. As shown in the figure, a position B2' of the oncoming vehicle B is located in front of the crossing point X at the time t2' when the host vehicle A starts the lane change, and the host vehicle A advances toward the rear of the oncoming vehicle B, and thus it is suppressed that the host vehicle A and the oncoming vehicle B travel so as to approach each other while facing each other.

In an example of FIG. 4B, the controller 180 (the lane change assistance unit 185) changes the travel route (the driving control information) during the lane change such that a steering angle of the host vehicle A during the lane change is smaller than an angle that has already been set. Due to the change, the start time t2 of the lane change of the host vehicle A is not changed, and thus it is unnecessary to consider the start time t2' of the lane change after the change as in the example shown in FIG. 4A. In the figure, positions A1 and A2 of the host vehicle A and positions B1 and B2 of the oncoming vehicle B are shown corresponding to times t1 and t2, respectively. Regarding the virtual advancing route of the host vehicle A, the virtual advancing route before the correction is indicated by a dotted line, and the virtual advancing route after the correction is indicated by a broken line.

As shown in the figure, by making the steering angle smaller than that before the change, the crossing point X is changed to the front side in the advancing direction of the host vehicle A, and thus the virtual arrival time ta until the host vehicle A virtually reaches the crossing point X becomes shorter. Further, since a distance between the oncoming vehicle B and the crossing point X increases, the predicted arrival time tb to the crossing point X of the oncoming vehicle B becomes longer. As a result, the virtual arrival time ta longer than the predicted arrival time tb becomes even longer, the predicted arrival time tb shorter than the virtual arrival time ta becomes even shorter, and at the same time, the predicted arrival time tb longer than the virtual arrival time ta becomes even longer, and thus the time difference td is outside the predetermined range. As shown in the figure, a position B2' of the oncoming vehicle B is located in front of the crossing point X at the time t2' when the host vehicle A starts the lane change, and the host vehicle A advances toward the rear of the oncoming vehicle B, and thus it is suppressed that the host vehicle A and the oncoming vehicle B travel so as to approach each other while facing each other.

In an example of FIG. 4C, the controller 180 (the lane change assistance unit 185) changes the travel route (the driving control information) during the lane change such that a start position of the lane change is located on the front side in the advancing direction of the host vehicle A with respect to the position that has already been set. Due to the change, a time t2' when the lane change is started according to the driving control information after the change is later than the time t2 when the lane change is started according to the driving control information before the correction. In the figure, positions of the host vehicle A and the oncoming vehicle B corresponding to times t1, t2, and t2' are shown. A position A2 of the host vehicle A at the time t2 before the correction is omitted for readability.

Since the crossing point X is changed to the front side in the advancing direction by changing the start position of the lane change to the front side in the advancing direction of the host vehicle A, the virtual arrival time ta until the host vehicle A virtually reaches the crossing point X becomes longer. Further, since a distance between the oncoming vehicle B and the crossing point X decreases, the predicted arrival time tb to the crossing point X of the oncoming vehicle B becomes shorter. As a result, the virtual arrival time ta longer than the predicted arrival time tb becomes even longer, and at the same time, the predicted arrival time tb shorter than the virtual arrival time ta becomes even shorter, and thus the time difference td is outside the predetermined range. As shown in the figure, the position B2' of the oncoming vehicle B is located on the front side of the crossing point X at the time t2' when the host vehicle A starts the lane change, and the host vehicle A advances toward the rear of the oncoming vehicle B, and thus it is suppressed that the host vehicle A and the oncoming vehicle B travel so as to approach each other while facing each other.

In an example of FIG. 5A, the controller 180 (the lane change assistance unit 185) changes the speed information (the driving control information) such that the speed of the host vehicle A is faster than a speed that has already been set before the start of the lane change without changing the travel route. Due to the change, the time t2' when the lane change is started according to the driving control information after the change is earlier than the time t2 when the lane change is started according to the driving control information before the correction. In the figure, positions of the host vehicle A and the oncoming vehicle B are shown corresponding to the times t1, t2', and t2, respectively. A position A2 of the host vehicle A at the time t2 before the correction is omitted for readability.

Since the start time t2' of the lane change becomes earlier by accelerating the host vehicle A before the start of the lane change, the virtual arrival time ta to the crossing point X of the host vehicle A becomes shorter. In this way, the virtual arrival time ta shorter than the predicted arrival time tb becomes even longer, and thus the time difference td is outside the predetermined range. As shown in the figure, the position B2' of the oncoming vehicle B is located in the rear of the crossing point X at the time t2' when the host vehicle A starts the lane change, and the host vehicle A advances toward the front of the oncoming vehicle B, and thus it is suppressed that the host vehicle A and the oncoming vehicle B travel so as to approach each other while facing each other.

In an example of FIG. 5B, the controller 180 (the lane change assistance unit 185) changes the travel route (the driving control information) during the lane change such that the steering angle of the host vehicle A during the lane change is larger than the angle that has already been set. Due to the change, the start time t2 of the lane change of the host vehicle A is not changed, and thus it is unnecessary to consider the start time t2' of the lane change after the change as in the example shown in FIG. 5A. Similarly to FIG. 4B, in the figure, positions A1 and A2 of the host vehicle A and positions B1 and B2 of the oncoming vehicle B are shown corresponding to times t1 and t2, respectively. Regarding the virtual advancing route, which is the virtual extension of the advancing route of the host vehicle in the advancing direction during the lane change of the host vehicle A, the virtual advancing route before the correction is indicated by a dotted line, and the virtual advancing route after the correction is indicated by a broken line.

As shown in the figure, by making the steering angle larger than that before the change, the crossing point X is changed to a near side in the advancing direction of the host vehicle A, and thus the virtual arrival time ta until the host vehicle A virtually reaches the crossing point X becomes shorter. Further, since a distance between the oncoming vehicle B and the crossing point X increases, the predicted arrival time tb to the crossing point X of the oncoming vehicle B becomes longer. As a result, the virtual arrival time ta shorter than the predicted arrival time tb becomes even shorter, and at the same time, the predicted arrival time tb longer than the virtual arrival time ta becomes even longer, and thus the time difference td is outside the predetermined range. As shown in the figure, the position B2' of the oncoming vehicle B is located in the rear of the crossing point X at the time t2' when the host vehicle A starts the lane change, and the host vehicle A advances toward the rear of the oncoming vehicle B, and thus it is suppressed that the host vehicle A and the oncoming vehicle B travel so as to approach each other while facing each other.

The determination of the crossing point X (S6) and the calculation of a time difference between the virtual arrival time ta and the predicted arrival time tb (S7) may be performed at a plurality of timings from the time t2 when the lane change is started to the time t3 when the lane change is ended. Accordingly, during the lane change from the start to the end of the lane change, it is possible to suppress the host vehicle A and the oncoming vehicle B from traveling so as to approach each other while facing each other.

In the present embodiment, as shown in FIGS. 4A to 5B, an example in which the set route and speed of the host vehicle A is changed is used, but the present invention is not limited thereto. The time difference may be outside the predetermined range by changing both of the path and the speed instead of changing either of the path and the speed.

According to the first embodiment, the following effects can be obtained.

According to the travel assistance method of the first embodiment, the controller 180 determines the crossing point X between the predicted travel route of the oncoming vehicle B and the virtual advancing route of the host vehicle A during the lane change (S6). Further, the virtual arrival time ta until the host vehicle A virtually reaches the crossing point X and the predicted arrival time tb until the oncoming vehicle B reaches the crossing point X are obtained, and it is determined whether it is necessary to change the driving control information according to whether the time difference td between the virtual arrival time ta and the predicted arrival time tb is within the predetermined range (S7).

When the time difference td is within the predetermined range, there is a possibility that the host vehicle A and the oncoming vehicle B advance toward the crossing point X while facing each other at the same timing. Therefore, the controller 180 changes the driving control information such that the time difference td is outside the predetermined range (S8), and performs the driving assistance of the host vehicle A based on the changed driving control information (S9).

Here, when the oncoming vehicle B approaches the host vehicle A while facing each other, the driver of the host vehicle A does not prefer such a situation, and there is a possibility that the driver of the host vehicle A performs a driving operation to prevent both vehicles from traveling while facing each other. However, since the time difference td is outside the predetermined range by correcting the driving control information described above, the host vehicle A and the oncoming vehicle B are suppressed from approaching each other while facing each other. As a result, the behavior of the host vehicle A is suppressed from becoming an unstable point caused by the driver performing an operation during the driving assistance, and thus it is possible to improve stability of the driving assistance control.

According to the travel assistance method of the first embodiment, as shown in FIG. 4A, when the time difference td is within the predetermined range and the correction is determined to be necessary (S7: Yes), the controller 180 (the lane change assistance unit 185) changes the speed information (the driving control information) so as to decelerate the host vehicle A before the start of the lane change.

Since the start time t2' of the lane change is delayed by decelerating the host vehicle A before the start of the lane change, the virtual arrival time ta becomes longer. The virtual arrival time ta becomes longer in this way, and thus the time difference td is outside the predetermined range. Due to the change, at the time t2' when the host vehicle A starts the lane change, the oncoming vehicle B is located further forward, and thus the host vehicle A and the oncoming vehicle B are suppressed from approaching each other while facing each other.

Due to the change, the virtual arrival time ta longer than the predicted arrival time tb becomes even longer when the time difference td is within the predetermined range and the correction is determined to be necessary (S7: Yes) and when the virtual arrival time ta of the host vehicle A is longer (later) than the predicted arrival time tb of the oncoming vehicle B. As a result, at the time t2' when the host vehicle A starts the lane change, the oncoming vehicle B is located further forward, and thus, the travel route of the host vehicle A becomes a travel route toward the rear of the oncoming vehicle B, and the host vehicle A and the oncoming vehicle B are suppressed from approaching each other while facing each other.

As shown in FIG. 4B, when the time difference td is within the predetermined range and the correction is determined to be necessary (S7: Yes), the controller 180 (the lane change assistance unit 185) changes the travel route (the driving control information) during the lane change such that the steering angle of the host vehicle A during the lane change becomes smaller.

By reducing the steering angle, the crossing point X is changed to the front side in the advancing direction of the host vehicle A, and thus the virtual arrival time ta becomes longer. Further, since the distance between the oncoming vehicle B and the crossing point X decreases, the predicted arrival time tb becomes shorter. Due to the change, the virtual arrival time ta becomes longer, and at the same time, the predicted arrival time tb becomes shorter, and thus the time difference td is outside the predetermined range. Due to the change, at the time t2 when the host vehicle A starts the lane change, the crossing point X is located further rearward, and the oncoming vehicle B is located further forward, and thus the host vehicle A and the oncoming vehicle B are suppressed from approaching each other while facing each other.

When the time difference td is within the predetermined range and the correction is determined to be necessary (S7: Yes), and when the virtual arrival time ta of the host vehicle A is longer (later) than the predicted arrival time tb of the oncoming vehicle B, due to the change, the virtual arrival time ta longer than the predicted arrival time tb becomes even longer, and at the same time, the predicted arrival time tb shorter than the virtual arrival time ta becomes even shorter, and thus the virtual arrival time ta longer than the predicted arrival time tb becomes even longer. As a result, at the time t2' when the host vehicle A starts the lane change, the crossing point X is located further rearward, and the oncoming vehicle B is located further forward, and thus, the travel route of the host vehicle A becomes a travel route toward the rear of the oncoming vehicle B and the host vehicle A and the oncoming vehicle B are suppressed from approaching each other while facing each other.

As shown in FIG. 4C, when the time difference td is within the predetermined range and the correction is determined to be necessary (S7: Yes), the controller 180 (the lane change assistance unit 185) changes the travel route (the driving control information) during the lane change such that the start position of the lane change is on the front side in the advancing direction of the host vehicle A.

By changing the start position of the lane change to the front side, the crossing point X is changed to the front side, and thus the virtual arrival time ta becomes longer. Further, since the distance between the oncoming vehicle B and the crossing point X decreases, the predicted arrival time tb becomes shorter. In this way, the virtual arrival time ta becomes longer, and at the same time, the predicted arrival time tb becomes shorter, and thus the time difference td is outside the predetermined range. Due to the change, at the time t2' when the host vehicle A starts the lane change, the crossing point X is located further rearward, and the oncoming vehicle B is located further forward, and thus the host vehicle A and the oncoming vehicle B are suppressed from approaching each other while facing each other.

When the time difference td is within the predetermined range and the correction is determined to be necessary (S7: Yes), and when the virtual arrival time ta of the host vehicle A is longer (later) than the predicted arrival time tb of the oncoming vehicle B, due to such a change, the virtual arrival time ta longer than the predicted arrival time tb becomes even longer, and at the same time, the predicted arrival time tb shorter than the virtual arrival time ta becomes even shorter, and thus the time difference td is outside the predetermined range. As a result, the crossing point X is located further rearward, and the oncoming vehicle B is located further forward, and thus, the travel route of the host vehicle A becomes a travel route toward the rear of the oncoming vehicle B and the host vehicle A and the oncoming vehicle B are suppressed from approaching each other while facing each other.

As shown in FIG. 5A, when the time difference td is within the predetermined range and the correction is determined to be necessary (S7: Yes), the controller 180 (the lane change assistance unit 185) changes the speed information (the driving control information) so as to accelerate the host vehicle A before the start of the lane change.

Since the start time t2' of the lane change becomes earlier by accelerating the host vehicle A before the start of the lane change, the virtual arrival time ta becomes shorter. The virtual arrival time ta becomes shorter in this way, and thus the time difference td is outside the predetermined range. Due to the change, at the time t2' when the host vehicle A starts the lane change, the oncoming vehicle B is located further rearward, and thus the host vehicle A and the oncoming vehicle B are suppressed from approaching each other while facing each other.

When the time difference td is within the predetermined range and the correction is determined to be necessary (S7: Yes), and when the virtual arrival time ta of the host vehicle A is shorter (earlier) than the predicted arrival time tb of the oncoming vehicle B, the virtual arrival time ta shorter than the predicted arrival time tb becomes even shorter due to such a change, and thus the time difference td is outside the predetermined range. As a result, at the time t2' when the host vehicle A starts the lane change, the oncoming vehicle B is located further rearward, and thus, the travel route of the host vehicle A becomes a travel route toward the front of the oncoming vehicle B and the host vehicle A and the oncoming vehicle B are suppressed from approaching each other while facing each other.

As shown in FIG. 5B, when the time difference td is within the predetermined range and the correction is determined to be necessary (S7: Yes), the controller 180 (the lane change assistance unit 185) changes the travel route (the driving control information) during the lane change such that the steering angle of the host vehicle A during the lane change becomes larger.

By increasing the steering angle, the crossing point X is changed to the near side in the advancing direction of the host vehicle A, and thus the virtual arrival time ta to the crossing point X of the host vehicle A becomes shorter. Further, since the distance between the oncoming vehicle B and the crossing point X increases, the predicted arrival time tb to the crossing point X of the oncoming vehicle B becomes longer. Therefore, the virtual arrival time ta becomes shorter, and at the same time, the predicted arrival time tb becomes longer, and thus the time difference td is outside the predetermined range. Due to the change, at the time t2' when the host vehicle A starts the lane change, the crossing point X is located further forward, and the oncoming vehicle B is located further rearward, and thus the host vehicle A and the oncoming vehicle B are suppressed from approaching each other while facing each other.

When the time difference td is within the predetermined range and the correction is determined to be necessary (S7: Yes), and when the virtual arrival time ta of the host vehicle A is shorter (earlier) than the predicted arrival time tb of the oncoming vehicle B, due to such a change, the virtual arrival time ta shorter than the predicted arrival time tb becomes even shorter, and at the same time, the predicted arrival time tb longer than the virtual arrival time ta becomes even longer, and thus the time difference td is outside the predetermined range. As a result, at the time t2' when the host vehicle A starts the lane change, the crossing point X is located further forward, and the oncoming vehicle B is located further rearward, and thus, the travel route of the host vehicle A becomes a travel route toward the front of the oncoming vehicle B and the host vehicle A and the oncoming vehicle B are suppressed from approaching each other while facing each other.

Although not illustrated, when the time difference td is within the predetermined range and the correction is determined to be necessary (S7: Yes), the controller 180 (the lane change assistance unit 185) may change the driving control information such that the start position of the lane change is in the rear of the host vehicle A.

Since the crossing point X is changed to the rear side by changing the start position of the lane change to the rear side of the host vehicle A, the virtual arrival time ta to the crossing point X of the host vehicle A becomes shorter. Further, since the distance between the oncoming vehicle B and the crossing point X increases, the predicted arrival time tb to the crossing point X of the oncoming vehicle B becomes longer. Therefore, the virtual arrival time ta becomes shorter, and at the same time, the long predicted arrival time tb becomes even longer, and thus the time difference td is outside the predetermined range. As a result, at the time t2' when the host vehicle A starts the lane change, the crossing point X is located further forward, and the oncoming vehicle B is located further rearward, and thus the host vehicle A and the oncoming vehicle B are suppressed from approaching each other while facing each other.

When the time difference td is within the predetermined range and the correction is determined to be necessary (S7: Yes), and when the virtual arrival time ta of the host vehicle A is shorter (earlier) than the predicted arrival time tb of the oncoming vehicle B, due to such a change, the virtual arrival time ta shorter than the predicted arrival time tb becomes even shorter, and at the same time, the predicted arrival time tb longer than the virtual arrival time ta becomes even longer, and thus the time difference td is outside the predetermined range. As a result, at the time t2' when the host vehicle A starts the lane change, the crossing point X is located further forward, and the oncoming vehicle B is located further rearward, and thus, the travel route of the host vehicle A becomes a travel route toward the front of the oncoming vehicle B and the host vehicle A and the oncoming vehicle B are suppressed from approaching each other while facing each other.

(Modification)

In the first embodiment, the controller 180 changes the route and the speed indicated by the driving control information as shown in FIGS. 4A to 4C, 5A, and 5B according to whether the time difference td between the virtual arrival time ta and the predicted arrival time tb is within the predetermined range.

Here, as described above, FIGS. 4A to 4C show the examples in which the driving control information is changed when the time difference td is within the predetermined range and the correction is determined to be necessary (S7: Yes) and when the virtual arrival time ta of the host vehicle A is longer (later) than the predicted arrival time tb of the oncoming vehicle B. FIGS. 5A and 5B show the examples in which the driving control information is changed when the time difference td is within the predetermined range and the correction is determined to be necessary (S7: Yes) and when the virtual arrival time ta is shorter (earlier) than the predicted arrival time tb.

Therefore, a change (a first change) shown in FIGS. 4A to 4C and a change (a second change) shown in FIGS. 5A and 5B may be switched according to a magnitude relation between the virtual arrival time ta and the predicted arrival time tb.

Figure 6:
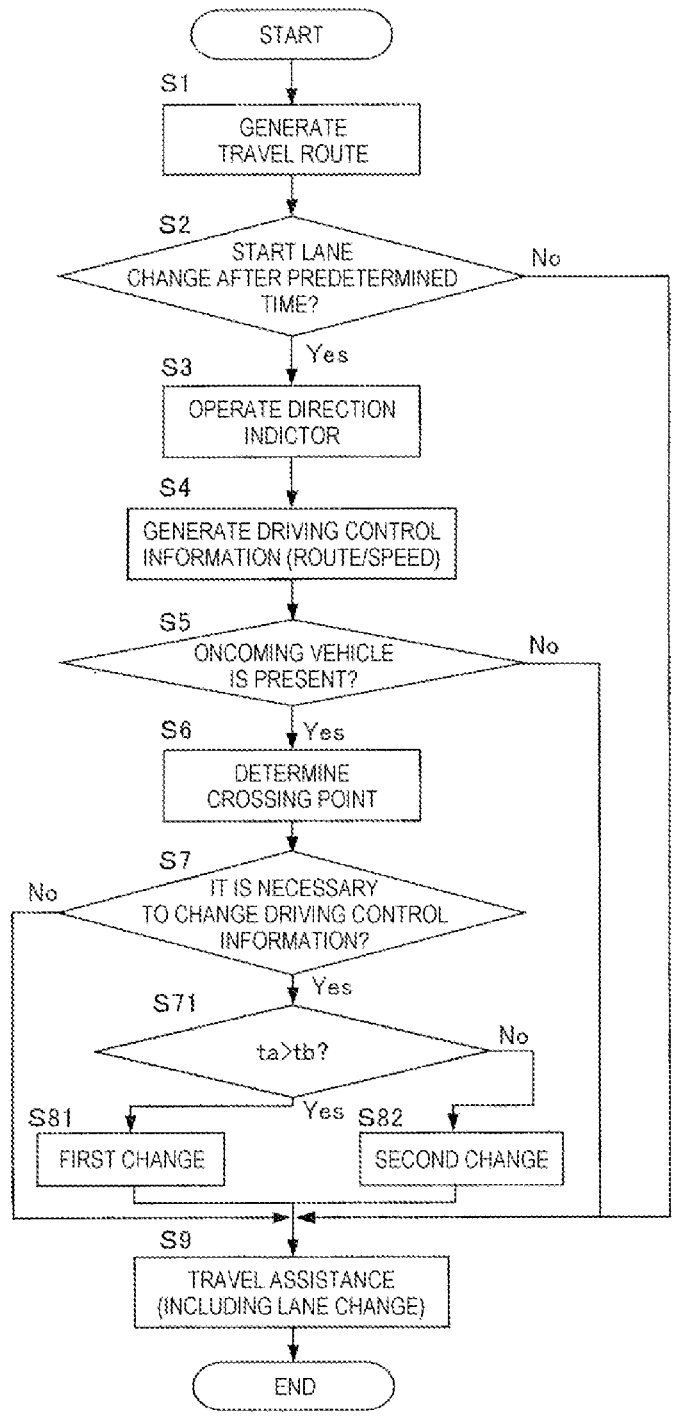
FIG. 6 is a flowchart showing travel assistance control according to a modification.

FIG. 6 is a flowchart of travel assistance control according to the present modification. According to the flowchart, as compared with the travel assistance control of the first embodiment shown in FIG. 2, determination processing of step S71 is provided after step S7, and a change of step S81 or step S82 is selectively performed according to the determination processing of step S71.

In step S71, the controller 180 (the change necessity determination unit 184) determines whether the virtual arrival time ta is longer than the predicted arrival time tb.

When the virtual arrival time ta is longer than the predicted arrival time tb (S71: Yes), as shown in FIGS. 4A to 4C, change processing of step S81 is performed next such that the host vehicle A travels toward the rear of the oncoming vehicle B. In step S81, the driving control information is changed such that the travel route of the host vehicle A becomes a travel route toward the rear of the oncoming vehicle B.

On the other hand, when the virtual arrival time ta is shorter than the predicted arrival time tb (S71: No), as shown in FIGS. 5A and 5B, change processing of step S82 is performed next such that the host vehicle A travels toward the front of the oncoming vehicle B. In step S82, the driving control information is changed such that the travel route of the host vehicle A becomes a travel route toward the front of the oncoming vehicle B.

According to the travel assistance method in such a modification, when a time difference td between a virtual arrival time tx and a predicted arrival time tb is within a predetermined range (S7: Yes) and the virtual arrival time ta is longer than the predicted arrival time tb (S71: Yes), the driving control information shown in FIGS. 4A to 4C is changed such that the host vehicle A travels toward the rear of the oncoming vehicle B (S81). In this way, the host vehicle A and the oncoming vehicle B are suppressed from approaching each other while facing each other, and a behavior of the host vehicle A is suppressed from becoming an unstable point caused by the driver performing an operation during the driving assistance, and thus it is possible to improve stability of the driving assistance control.

When the time difference td between the virtual arrival time tx and the predicted arrival time tb is within the predetermined range (S7: Yes) and the virtual arrival time ta is shorter than the predicted arrival time tb (S71: No), the driving control information shown in FIGS. 5A and 5B is changed such that the host vehicle A travels toward the front of the oncoming vehicle B (S82). In this way, the host vehicle A and the oncoming vehicle B are suppressed from approaching each other while facing each other, and the behavior of the host vehicle A is suppressed from becoming the unstable point caused by the driver performing an operation during the driving assistance, and thus it is possible to improve stability of the driving assistance control.

Second Embodiment

In the first embodiment, the controller 180 predicts the virtual arrival time ta (a first time) to the crossing point X and the predicted arrival time tb (a second time) until the oncoming vehicle B reaches the crossing point X, and determines whether it is necessary to change the driving control information according to whether the time difference td between the virtual arrival time ta (the first time) and the predicted arrival time tb (the second time) is within the predetermined range, but the present invention is not limited thereto. In the second embodiment, an example will be described in which the controller 180 sets a crossing region Y in a vicinity of the crossing point X, and determines whether a change is necessary according to whether the time difference td is within a predetermined range or the oncoming vehicle B is present in the crossing region Y at the virtual arrival time ta.

Figure 7:
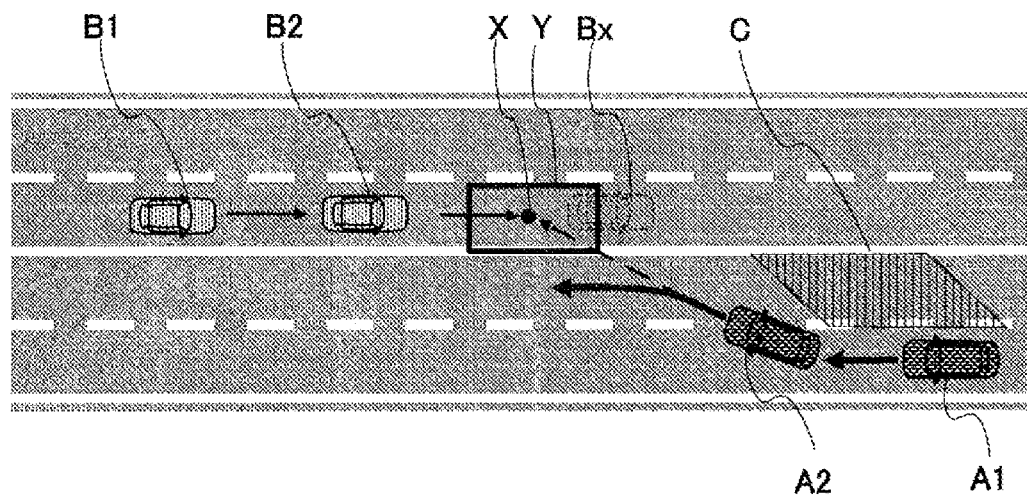
FIG. 7 is a diagram showing a situation around a host vehicle in a case where a route and/or a vehicle speed is changed in travel assistance control according to a second embodiment.

Specifically, as shown in FIG. 7, the controller 180 sets an crossing region Y having a predetermined region length in a front-rear direction along an advancing route direction of the oncoming vehicle B with the crossing point X as a center. The controller 180 obtains a virtual arrival time tx in a case where it is assumed that the host vehicle A advances linearly on a virtual advancing route and reaches the crossing point X without completing a lane change.

The controller 180 estimates a position Bx of the oncoming vehicle B at the virtual arrival time tx, and determines whether correction is necessary according to whether the estimated position Bx of the oncoming vehicle B is present in the crossing region Y. When the position Bx is within the crossing region Y, the host vehicle A and the oncoming vehicle B travel toward the crossing point X while facing each other at the same timing, and there is a high possibility that both vehicles approach each other, and thus it is determined that the correction of the driving control information is necessary.

Figure 8:
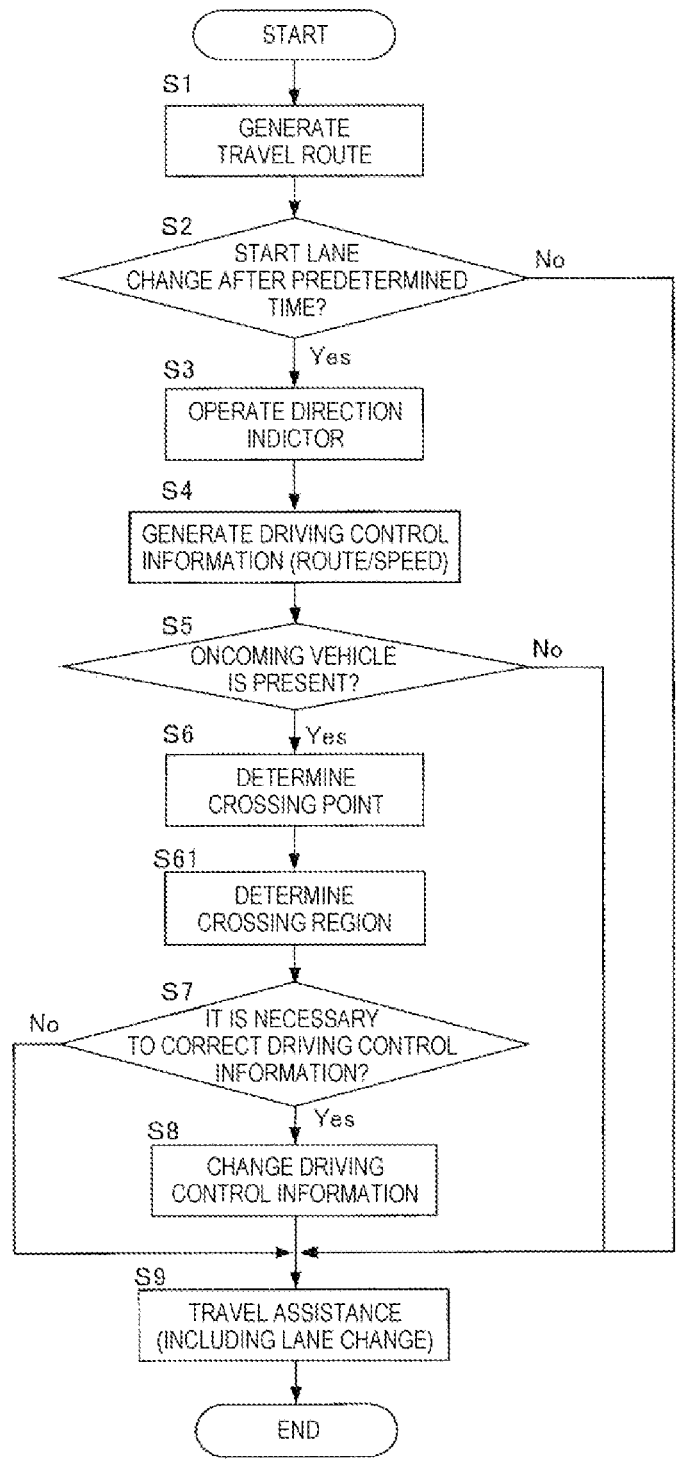
FIG. 8 is a flowchart showing the travel assistance control.

FIG. 8 is a flowchart of travel assistance control according to the second embodiment. According to the flowchart, as compared with the travel assistance control of the first embodiment shown in FIG. 2, processing of step S61 is provided after step S6.

In step S61, the controller 180 sets an crossing region Y having a predetermined region length in a front-rear direction along an advancing route direction of the oncoming vehicle B with the crossing point X as a center. Here, the region length may be a fixed value obtained by multiplying a speed of the oncoming vehicle B by the time difference td, or may be a variable value as shown in a modification to be described later.

In step S7, the controller 180 estimates a position Bx of the oncoming vehicle B at the virtual arrival time tx, and determines whether correction is necessary according to whether the estimated position Bx of the oncoming vehicle B is present in the crossing region Y. When the position Bx of the oncoming vehicle B at the virtual arrival time tx is within the crossing region Y, it is determined that the correction of the driving control information is necessary.

In this way, when the position Bx of the oncoming vehicle B at the virtual arrival time tx is within the crossing region Y, it is determined that the correction of the driving control information is necessary (S7: Yes), and then correction processing of step S8 is performed. When the position Bx of the oncoming vehicle B is outside the crossing region Y, it is determined that the correction of the driving control information is unnecessary (S7: No), and then assistance processing of step S9 is performed.

According to the travel assistance method of the second embodiment, as shown in FIG. 7, the controller 180 determines the crossing point X between the predicted travel route of the oncoming vehicle B and the virtual advancing route of the host vehicle A during the lane change (S6), and further determines the crossing region Y having the region length in the front-rear direction of the oncoming vehicle B with respect to the crossing point X (S61). Then, the controller 180 determines whether the oncoming vehicle B is present in the crossing region Y at the virtual arrival time tx predicted on an assumption that the host vehicle A reaches the crossing point X (S7).

When the oncoming vehicle B is present in the crossing region Y, the host vehicle A and the oncoming vehicle B advance toward the crossing point X while facing each other. Therefore, the controller 180 changes the driving control information (S8), and performs the driving assistance of the host vehicle A based on the changed driving control information (S9), thereby performing control such that the oncoming vehicle B is not present in the crossing region Y at the virtual arrival time tx. Specifically, when the correction as shown in FIGS. 4A to 4C is performed, the oncoming vehicle B is located in front of the crossing region Y at the virtual arrival time tx, and when the correction as shown in FIGS. 5A and 5B is performed, the oncoming vehicle B is located in the rear of the crossing region Y at the virtual arrival time tx.

Here, in a case where the oncoming vehicle B is present in the crossing region Y at the virtual arrival time tx, before the virtual arrival time tx, the host vehicle A and the oncoming vehicle B advance toward the crossing point X while facing each other at the same timing, and thus both vehicles approach each other. Due to such approach, the driver of the host vehicle A may perform a driving operation to prevent both vehicles from traveling while facing each other. However, since the oncoming vehicle B is outside the crossing region Y at the virtual arrival time tx by correcting the driving control information described above, the host vehicle A and the oncoming vehicle B are suppressed from approaching each other while facing each other.

As described above, according to the travel assistance method of the second embodiment, it is possible to determine whether it is necessary to correct the driving control information by obtaining the crossing region Y and the position Bx of the oncoming vehicle B at the virtual arrival time tx instead of calculating the predicted arrival time tb as in the first embodiment. As a result, flexibility of a design method is improved, and the behavior of the host vehicle A is suppressed from becoming an unstable point caused by the driver performing an operation during the driving assistance, and thus it is possible to improve stability of the driving assistance control.

(Modification)

In the first and second embodiments, the crossing region Y is set so as to have the predetermined region length in the front-rear direction of the oncoming vehicle B with respect to the crossing point X. In the present modification, an example in which the region length of the crossing region Y in the front-rear direction is changed by an external factor will be described.

As a first example, the faster a relative speed between the host vehicle A and the oncoming vehicle B, the longer a region length of a crossing range in the front-rear direction. As the relative speed increases, the driver of the host vehicle A tends not to prefer that the oncoming vehicle B approaches the host vehicle A while facing each other. Therefore, by increasing the region length of the crossing region Y as the relative speed between the host vehicle A and the oncoming vehicle B increases, the oncoming vehicle B is more likely to be included in the crossing region Y, and thus the driving control information is more likely to be changed. As a result, it is possible to suppress the host vehicle A and the oncoming vehicle B approaching each other.

As a second example, the narrower a road width of the host vehicle A or the oncoming vehicle B, the longer the region length of the crossing region Y. As the road width is narrower, the driver of the host vehicle A tends not to prefer that the oncoming vehicle B approaches the host vehicle A while facing each other. Therefore, by further increasing the region length of the crossing region Y as road widths of the host vehicle A and the oncoming vehicle B are narrower, the oncoming vehicle B is more likely to be included in the crossing region Y, and thus the driving control information is more likely to be changed. As a result, it is possible to suppress the host vehicle A and the oncoming vehicle B approaching each other.

Similarly, as the host vehicle A or the oncoming vehicle B is smaller, the driver of the host vehicle A tends not to prefer that the oncoming vehicle B approaches the host vehicle A while facing each other. For example, the controller 180 may determine a size of the host vehicle A or the oncoming vehicle B based on a vehicle type of the host vehicle A stored in advance or an outer shape of the oncoming vehicle B imaged by the camera 110. In another example, the controller 180 may set the region length in accordance with a vehicle width of the host vehicle A or the oncoming vehicle B.

In this way, by the controller 180 further increasing the region length of the crossing region Y as the host vehicle A and the oncoming vehicle B are smaller, the oncoming vehicle B is more likely to be included in the crossing region Y, and thus the driving control information is more likely to be changed. As a result, it is possible to suppress the host vehicle A and the oncoming vehicle B approaching each other.

Third Embodiment

In the first or second embodiment, a case where one oncoming vehicle B is traveling in the opposite lane has been described, but the present invention is not limited thereto. In the third embodiment, it may be determined whether the correction of the driving control information is necessary in a case where a plurality of oncoming vehicles B are present.

When detecting a plurality of oncoming vehicles B traveling in an opposite lane of an advancing route after a lane change, the controller 180 determines whether it is necessary to change the driving control information for the plurality of oncoming vehicles B. When it is determined that it is necessary to change the driving control information for at least one oncoming vehicle B, the driving control information is changed. However, for a purpose of reducing a processing load, the necessity of the change may not be determined for some oncoming vehicles B. Such a situation will be described with reference to FIGS. 9 to 11.

Figure 9:
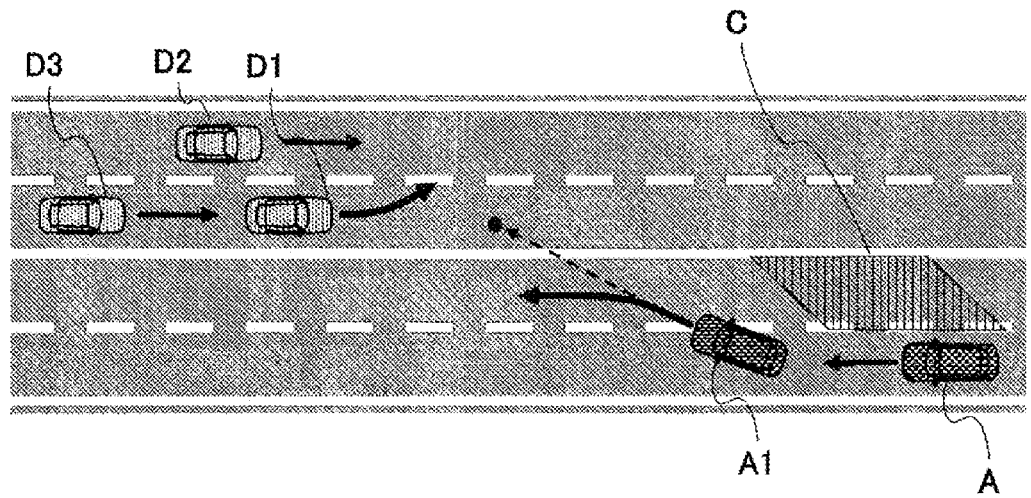
FIG. 9 is an explanatory diagram of an oncoming vehicle used for determining whether it is necessary to change a route and/or a vehicle speed in a third embodiment.
Figure 10:
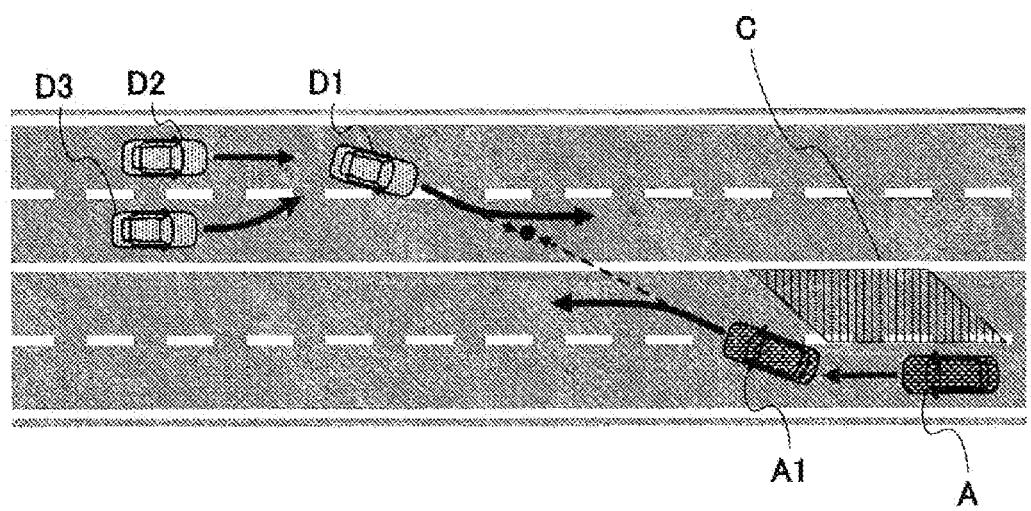
FIG. 10 is an explanatory diagram of an oncoming vehicle used for determining whether it is necessary to change a route and/or a vehicle speed.

FIGS. 9 and 10 are diagrams showing a situation in which travel assistance control according to the third embodiment is performed. According to the figures, the host vehicle A and a plurality of oncoming vehicles D1 to D3 are shown.

In an example of FIG. 9, oncoming vehicles D1, D2, and D3 travel in the opposite lane in an order of an advancing direction. The oncoming vehicles D1 and D3 are traveling in an inner travel lane, and the oncoming vehicle D2 is traveling in an outer opposite lane. It is assumed that the oncoming vehicle D1 intends to change a lane to an outer lane. It is assumed that the controller 180 can predict an advancing route of each of the oncoming vehicles D1 to D3 using imaging information of the camera 110.

In such a case, the controller 180 omits the determination of whether it is necessary to change the driving control information for the oncoming vehicle D2 advancing linearly in the outer lane and the oncoming vehicle D1 attempting to change the lane to the outer lane, and determines whether it is necessary to change the driving control information for the oncoming vehicle D3 traveling in the inner lane. In this way, it is possible to reduce the number of target oncoming vehicles D, and thus it is possible to reduce the processing load of the travel assistance control.

In an example of FIG. 10, oncoming vehicles D1, D2, and D3 travel in the opposite lane in an order of an advancing direction. The oncoming vehicles D1 and D2 are traveling in an outer travel lane, and the oncoming vehicle D3 is traveling in an inner opposite lane. It is assumed that the oncoming vehicle D1 intends to change a lane to an inner lane, and the oncoming vehicle D3 intends to change a lane to an outer lane.

In such a case, the controller 180 omits the determination of whether it is necessary to change the driving control information for the oncoming vehicle D2 advancing linearly in the outer lane and the oncoming vehicle D3 changing the lane to the outer lane, and determines whether it is necessary to change the driving control information for the oncoming vehicle D1 changing the lane to the inner lane. In this case, a crossing point X between a virtual advancing route of the host vehicle A during the lane change and a predicted travel route of the oncoming vehicle D1 that performs the lane change is determined. In this way, it is possible to reduce the number of the target oncoming vehicles D, and thus it is possible to reduce the processing load of the travel assistance control.

Figure 11:
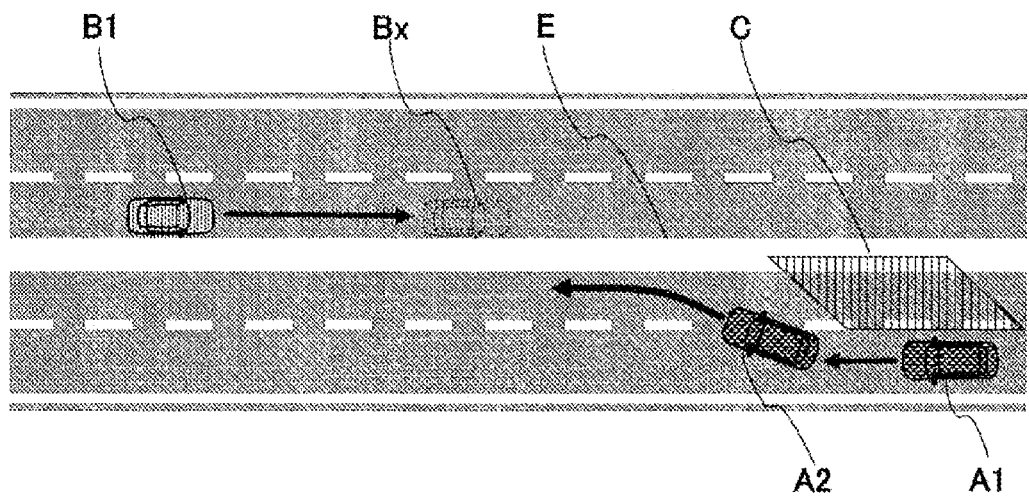
FIG. 11 is an explanatory diagram of an example in which a median strip is present.

As shown in FIG. 11, in a case where a median strip E is present between the travel lane of the host vehicle A and the opposite lane in which the oncoming vehicle B travels, even if the host vehicle A and the oncoming vehicle B advance toward the crossing point X, the driver of the host vehicle A is less likely to feel anxiety. Therefore, it is possible to reduce the processing load of the travel assistance control by omitting the change control of the driving control information.

Fourth Embodiment

In the first to third embodiments, the lane change performed by the host vehicle has been described, but the present invention is not limited thereto. In the fourth embodiment, an example of a lane change will be described in which a host vehicle turns and enters the linear advancing lane from a side road at a T junction where the linear advancing lane and the side road intersect with each other.

Figure 12:
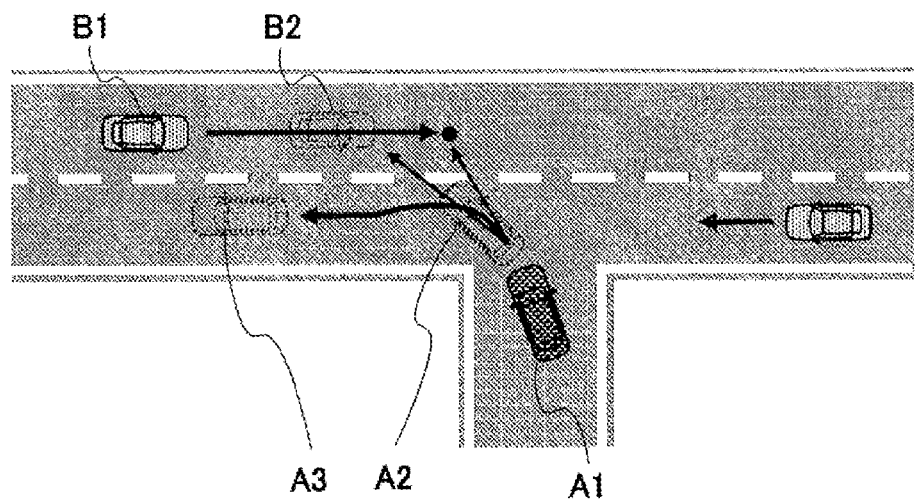
FIG. 12 is a diagram showing a situation around a host vehicle in a case where a route and/or a vehicle speed is changed in travel assistance control according to a fourth embodiment.
Figure 13:
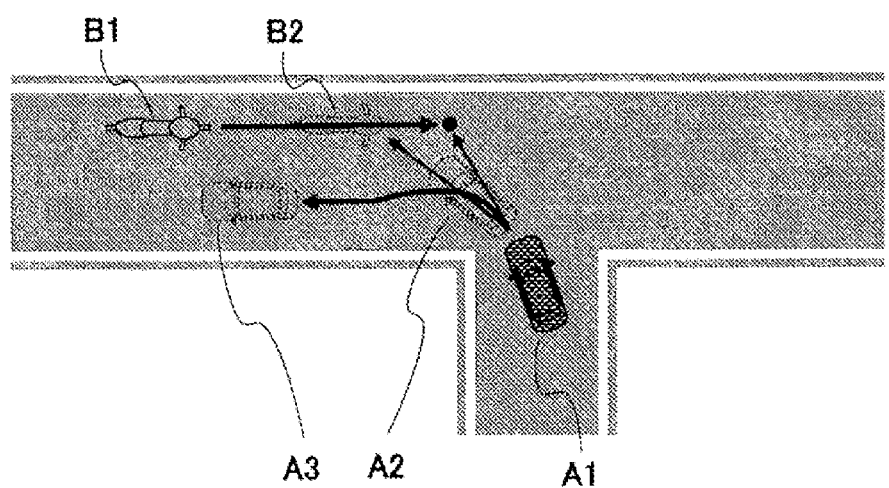
FIG. 13 is a diagram showing a situation around a host vehicle in a case where a route and/or a vehicle speed is changed.

FIGS. 12 and 13 are diagrams showing a situation in which travel assistance control according to the fourth embodiment is performed.

In an example of FIG. 12, it is assumed that at a T intersection where a travel lane of one lane on each side intersects with a side road, a lane change is performed such that a host vehicle A turns and enters the travel lane from the side road. In the lane change, a left turn is made at the T intersection to enter a travel lane on a side adjacent to the side road, instead of making a right turn at the T intersection crossing an opposite lane.

Regarding the host vehicle A, a host vehicle A1 at a time t1 when the lane change (turning) is started, a host vehicle A2 at a time t2 when the host vehicle A is turning, and a host vehicle A3 at a time t3 when the lane change (turning) is ended are shown. Similarly, regarding the oncoming vehicle B, oncoming vehicles B1 to B3 corresponding to times t1 to t3 are shown.

Also in such a case, the controller 180 obtains a crossing point X between a predicted travel lane of the oncoming vehicle B and a virtual advancing route being a virtual extension of an advancing route of the host vehicle A in an advancing direction during the lane change. A virtual arrival time ta until the host vehicle A reaches the crossing point X and a predicted arrival time tb until the oncoming vehicle B reaches the crossing point X may be obtained, and it may be determined whether it is necessary to change driving control information according to whether a time difference td between the virtual arrival time ta and the predicted arrival time tb is within a predetermined range.

In the figure, a following vehicle F is shown on a right side of the host vehicle A during the lane change, that is, behind the host vehicle A after the lane change. The controller 180 may determine a crossing point according to a crossing point between a virtual advancing route during turning of the host vehicle A and a predicted advancing route of the following vehicle F, and may determine whether it is necessary to change the driving control information according to a time difference between a time until the host vehicle A reaches the crossing point and a predicted time until the following vehicle F reaches the crossing point. In this way, it is possible to suppress the host vehicle A and the following vehicle F from approaching each other.

FIG. 13 shows an example in which the host vehicle A turns toward a main lane when the oncoming vehicle B is a two-wheeled vehicle on a T junction without a lane. Even in this case, by performing the travel assistance control, the controller 180 may determine whether the driving control information is changed by determining a crossing region Y from a crossing point X between a virtual advancing route during turning of the host vehicle A and a predicted travel lane of the oncoming vehicle B and determining whether the oncoming vehicle B is within the crossing region Y at a virtual arrival time tx.

The travel assistance control described above is not limited to a case where the host vehicle performs a lane change such as changing a lane or a travel route as described above, and includes a case where the host vehicle starts from a road shoulder.

Although the embodiments of the present invention have been described above, the embodiments merely exemplify some of application examples of the present invention and do not intend to limit the technical scope of the present invention to the specific configurations of the embodiments.

Each of the embodiments described above has been described as a single embodiment, but may be appropriately combined.

The invention claimed is:

1. A travel assistance method for performing a lane change of a host vehicle using a determined route and vehicle speed, the travel assistance method comprising:
   detecting an oncoming vehicle traveling in an opposite lane opposite to a lane in which the host vehicle travels when the host vehicle starts the lane change;
   determining a crossing point between a virtual advancing route of the host vehicle and a linear advancing route in which the oncoming vehicle advances linearly, the virtual advancing route differing from the determined route and being a virtual extension of an advancing route of the host vehicle in an advancing direction thereof, the advancing route being based on the determined route during a period from a start to an end of the lane change;
   executing a lane change using the determined route and the vehicle speed in a case where a time difference between a first predicted time when it is assumed that the host vehicle reaches the crossing point and a second predicted time until the oncoming vehicle reaches the crossing point is outside a predetermined range; and
   when the time difference is within the predetermined range, executing the lane change by changing at least one of the determined route or the vehicle speed such that the time difference is outside the predetermined range.

2. The travel assistance method according to claim 1, further comprising:
   decelerating before the start of the lane change when the time difference is within the predetermined range and the first predicted time is longer than the second predicted time.

3. The travel assistance method according to claim 1, further comprising:
   accelerating before the start of the lane change when the time difference is within the predetermined range and the first predicted time is equal to or less than the second predicted time.

4. The travel assistance method according to claim 1, further comprising:
   changing the determined route so as to reduce a steering angle of the lane change when the time difference is within the predetermined range and the first predicted time is longer than the second predicted time.

5. The travel assistance method according to claim 1, further comprising:
   changing the determined route so as to increase a steering angle of the lane change when the time difference is within the predetermined range and the first predicted time is equal to or less than the second predicted time.

6. The travel assistance method according to claim 1, further comprising:
   changing the determined route such that a start position of the lane change is on a front side in the advancing direction when the time difference is within the predetermined range and the first predicted time is longer than the second predicted time.

7. The travel assistance method according to claim 1, further comprising:
   changing the determined route such that a start position of the lane change is on a near side in the advancing direction when the time difference is within the predetermined range and the first predicted time is equal to or less than the second predicted time.

8. The travel assistance method according to claim 1, further comprising:
   determining a crossing region having a region length according to a speed of the oncoming vehicle and the time difference in a front-rear direction of an advancing route of the oncoming vehicle with respect to the crossing point;
   determining whether the oncoming vehicle is within the crossing region after the first predicted time;
   executing a lane change using the determined route and the vehicle speed when the oncoming vehicle is outside the crossing region after the first predicted time; and
   when the oncoming vehicle is within the crossing region after the first predicted time, executing a lane change by changing at least one of the determined route or the vehicle speed such that the oncoming vehicle is outside the crossing region after the first predicted time.

9. The travel assistance method according to claim 8, wherein a faster a relative speed between the host vehicle and the oncoming vehicle, a longer the region length of the crossing region.

10. The travel assistance method according to claim 8, wherein a narrower a road width of a travel route of the host vehicle after the lane change or the narrower a road width of a travel route of the oncoming vehicle, a longer the region length of the crossing region.

11. The travel assistance method according to claim 8, wherein the smaller the host vehicle or the oncoming vehicle, the longer the region length of the crossing region.

12. The travel assistance method according to claim 1, further comprising:
   detecting presence or absence of a median strip between a travel route after the lane change and a travel route of the oncoming vehicle; and
   changing a route of the lane change when the median strip is not detected.

13. A travel assistance device comprising:
   a sensor configured to detect a surrounding environment of a host vehicle, wherein the travel assistance device is configured to:
      determine a travel route and vehicle speed of the host vehicle based on information on the surrounding environment detected by the sensor;
      execute a lane change of the host vehicle using the determined travel route and vehicle speed;
      detect an oncoming vehicle traveling in an opposite lane opposite to a lane in which the host vehicle travels when the host vehicle starts the lane change;
      determine a crossing point between a virtual advancing route of the host vehicle and a linear advancing route in which the oncoming vehicle advances linearly, the virtual advancing route differing from the determined travel route and being a virtual extension of an advancing route of the host vehicle in an advancing direction thereof, the advancing route being based on the determined travel route during a period from start to end of the lane change;

execute a lane change using the determined travel route and the vehicle speed in a case where a time difference between a first predicted time when it is assumed that the host vehicle reaches the crossing point and a second predicted time until the oncoming vehicle reaches the crossing point is outside a predetermined range; and when the time difference is within the predetermined range, execute the lane change by changing at least one of the determined travel route or the vehicle speed such that the time difference is outside the predetermined range.

14. A travel assistance method for performing a turning of a host vehicle using a determined route and vehicle speed, the travel assistance method comprising:

detecting an oncoming vehicle traveling in an opposite lane opposite to a travel lane when the host vehicle turns and enters the travel lane from a side road;

determining a crossing point between a virtual advancing route of the host vehicle and a linear advancing route in which the oncoming vehicle advances linearly, the virtual advancing route differing from the determined route and being a virtual extension of an advancing route of the host vehicle in an advancing direction thereof, the advancing route being based on the determined route at a start of the turning;

executing the turning using the determined route and the vehicle speed in a case where a time difference between a first predicted time when it is assumed that the host vehicle reaches the crossing point and a second predicted time until the oncoming vehicle reaches the crossing point is outside a predetermined range; and when the time difference is within the predetermined range, executing the turning by changing at least one of the determined route or the vehicle speed such that the time difference is outside the predetermined range.

* * * * *